US008595410B2

(12) United States Patent
Nagadomi

(10) Patent No.: US 8,595,410 B2
(45) Date of Patent: Nov. 26, 2013

(54) MEMORY SYSTEM AND BUS SWITCH

(75) Inventor: Yasushi Nagadomi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 163 days.

(21) Appl. No.: 12/435,671

(22) Filed: May 5, 2009

(65) Prior Publication Data
US 2009/0319716 A1 Dec. 24, 2009

(30) Foreign Application Priority Data

Jun. 20, 2008 (JP) ................................ 2008-162281

(51) Int. Cl.
*G06F 12/00* (2006.01)

(52) U.S. Cl.
USPC .................................. 711/103; 711/E12.001

(58) Field of Classification Search
USPC .......................................................... 711/103
See application file for complete search history.

(56) References Cited

U.S. PATENT DOCUMENTS

| 5,438,536 | A | * | 8/1995 | Salzman .......................... 365/52 |
|---|---|---|---|---|
| 5,603,001 | A | * | 2/1997 | Sukegawa et al. ............. 711/103 |
| 5,671,388 | A | * | 9/1997 | Hasbun .......................... 711/103 |
| 6,542,393 | B1 | * | 4/2003 | Chu et al. ......................... 365/51 |
| 2007/0288687 | A1 | * | 12/2007 | Panabaker ..................... 711/103 |
| 2008/0010483 | A1 | * | 1/2008 | Kuroishi et al. ................. 714/2 |
| 2008/0052451 | A1 | * | 2/2008 | Pua et al. ....................... 711/103 |
| 2008/0114922 | A1 | * | 5/2008 | Chou et al. .................... 711/103 |

FOREIGN PATENT DOCUMENTS

| JP | 2004-516576 | 6/2004 |
|---|---|---|
| JP | 3688835 | 6/2005 |
| JP | 2006-331310 | 12/2006 |

OTHER PUBLICATIONS

Office Action issued Sep. 4, 2012, in Japanese Patent Application No. 2008-162281, filed Jun. 20, 2008 (with English-language Translation).

* cited by examiner

*Primary Examiner* — Larry Mackall
(74) *Attorney, Agent, or Firm* — Oblon, Spivak, McClelland, Maier & Neustadt, L.L.P.

(57) ABSTRACT

A memory system includes a nonvolatile memory having a plurality of nonvolatile memory chips incorporated therein, a control circuit that controls the nonvolatile memory, an MPU that controls the control circuit, and an interface circuit that communicates with a host, all of which are mounted on a board of the memory system, and the memory system further includes a bus switch that switches connection of a signal line between the control circuit and the nonvolatile memory chips.

9 Claims, 16 Drawing Sheets

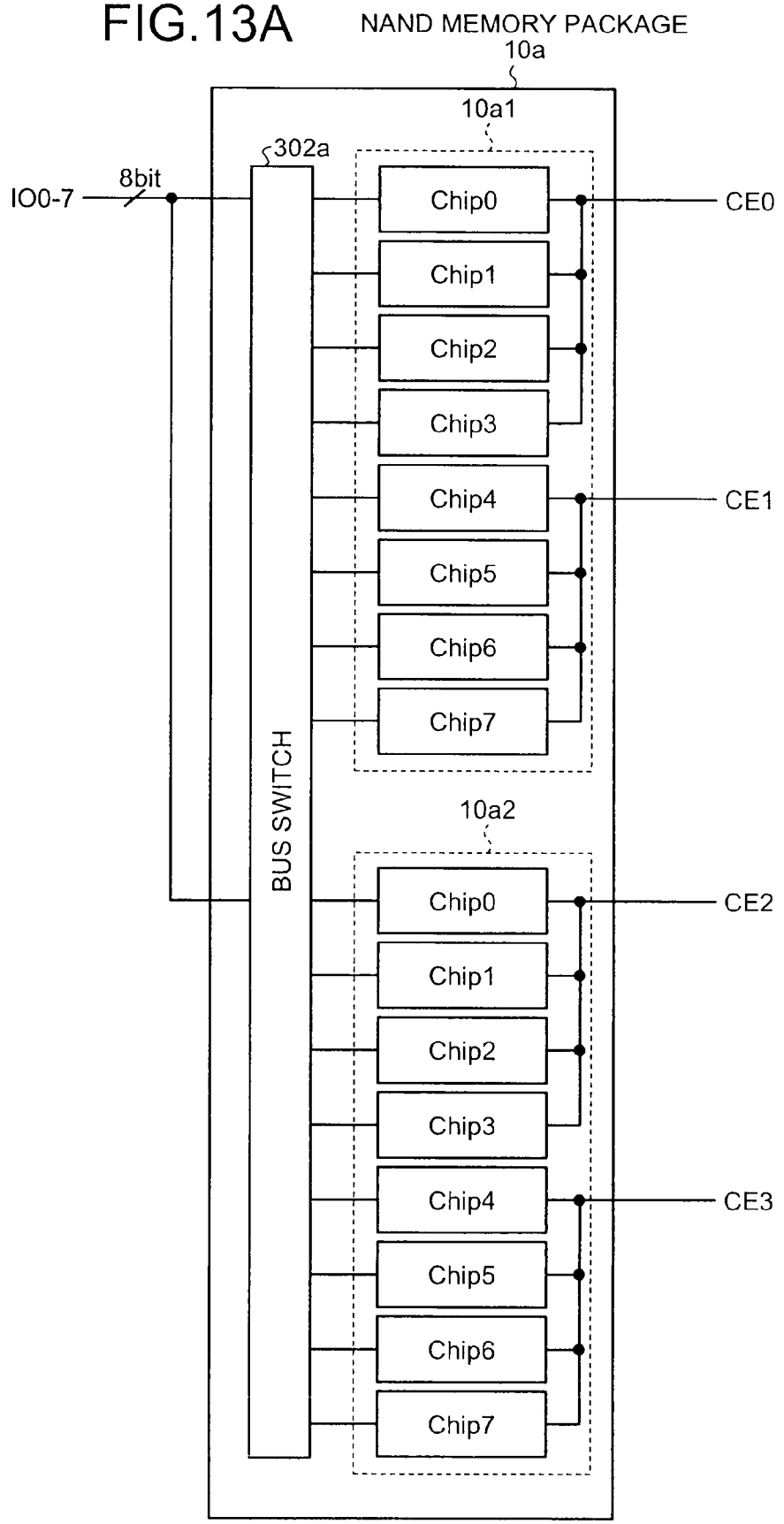

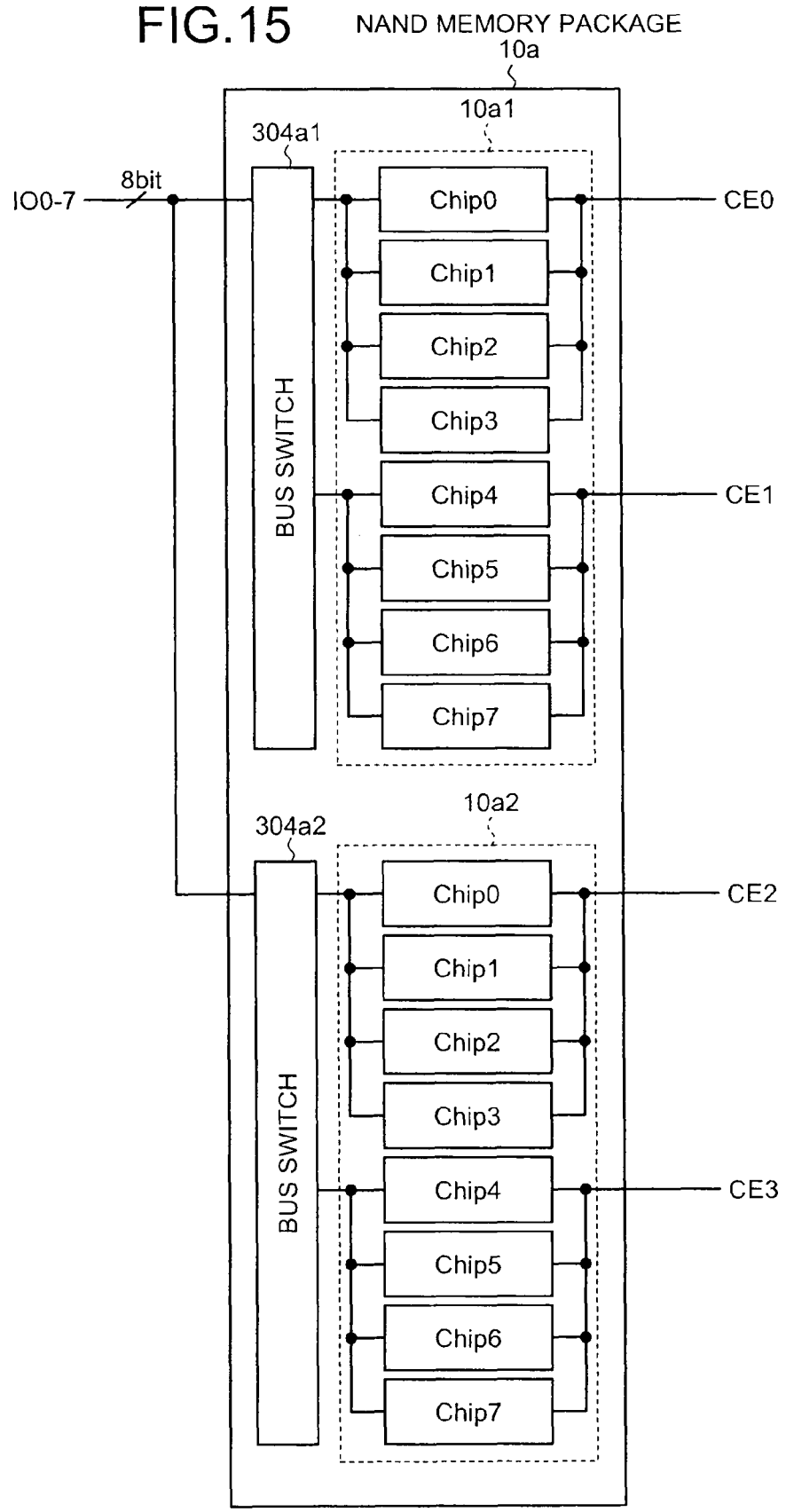

MEMORY SYSTEM AND BUS SWITCH

CROSS-REFERENCE TO RELATED APPLICATIONS

This application is based upon and claims the benefit of priority from the prior Japanese Patent Applications No. 2008-162281, filed on Jun. 20, 2008, the entire contents of which are incorporated herein by reference.

BACKGROUND OF THE INVENTION

1. Field of the Invention

The present invention relates to a memory system and a bus switch.

2. Description of the Related Art

Solid state drive (SSD) has recently attracted attention as a memory system equipped with a flash memory (flash EEPROM), as an external memory used for a computer system. The flash memory has advantages such as high speed and lightweight, as compared to a magnetic disk unit.

An SSD includes a plurality of flash memory chips, a controller that controls reading and writing of the respective flash memory chips in response to a request from a host device, a buffer memory for performing data transfer between the respective flash memory chips and the host device, a power circuit, and a connection interface with respect to the host device (for example, Japanese Patent Publication No. 3688835).

When an SSD is designed, however, a stacked product in which a plurality of memory chips is stacked needs to be used to increase a data capacity, while the number of pins of a controller chip and mounting footprints are limited. In such a stacked product, an IO signal line and a control signal line are arranged for several memory chips inside thereof, and a load capacity of respective signal lines increases with an increase of the stacked number of memory chips.

When the load capacity of the respective signal lines increases, a delay occurs due to a CR delay in the IO signal and the control signal. When a synchronously designed controller is used, data read from a memory can be latched and output in a low load state (with the number of stacks being small); however, in a high load state (with the number of stacks being large), the data read from the memory may not be latched and output due to a delay in the data caused by the CR delay.

Likewise, when the load capacity of each signal lines increases, a write error may occur with respect to the memory due to a signal delay.

SUMMARY OF THE INVENTION

According to one aspect of the present invention, a memory system includes a nonvolatile memory having a plurality of nonvolatile memory chips incorporated therein, a control circuit that controls the nonvolatile memory, an MPU that controls the control circuit, and an interface circuit that communicates with a host, all of which are mounted on a board of the memory system, and the memory system further includes a bus switch that switches connection of a signal line between the control circuit and the nonvolatile memory chips.

According to another aspect of the preset invention, a bus switch provided in a memory system, includes a nonvolatile memory having a plurality of nonvolatile memory chips incorporated therein, a control circuit that controls the nonvolatile memory, an MPU that controls the control circuit, and an interface circuit that communicates with a host, all of which are mounted on a board of the memory system, wherein the bus switch switches connection of a signal line between the control circuit and the nonvolatile memory chips.

BRIEF DESCRIPTION OF THE DRAWINGS

FIG. 13A is a schematic diagram for explaining a first modification of the second embodiment;

FIG. 15 is a schematic diagram for explaining a NAND controller and a NAND memory according to a fourth embodiment of the present invention.

DETAILED DESCRIPTION OF THE PREFERRED EMBODIMENTS

Exemplary embodiments of a memory system and a bus switch according to the present invention will be explained below in detail with reference to the accompanying drawings. The present invention is not limited thereto. A memory system according to an embodiment of the present invention includes a nonvolatile semiconductor memory, and is used, for example, as a secondary storage (solid state drive (SSD)) of the host device such as a personal computer. The memory system has a function for storing data, for which a writing request has been issued from the host device, and reading data, for which a reading request has been issued from the host device, to output the data to the host device.

Figure 1:
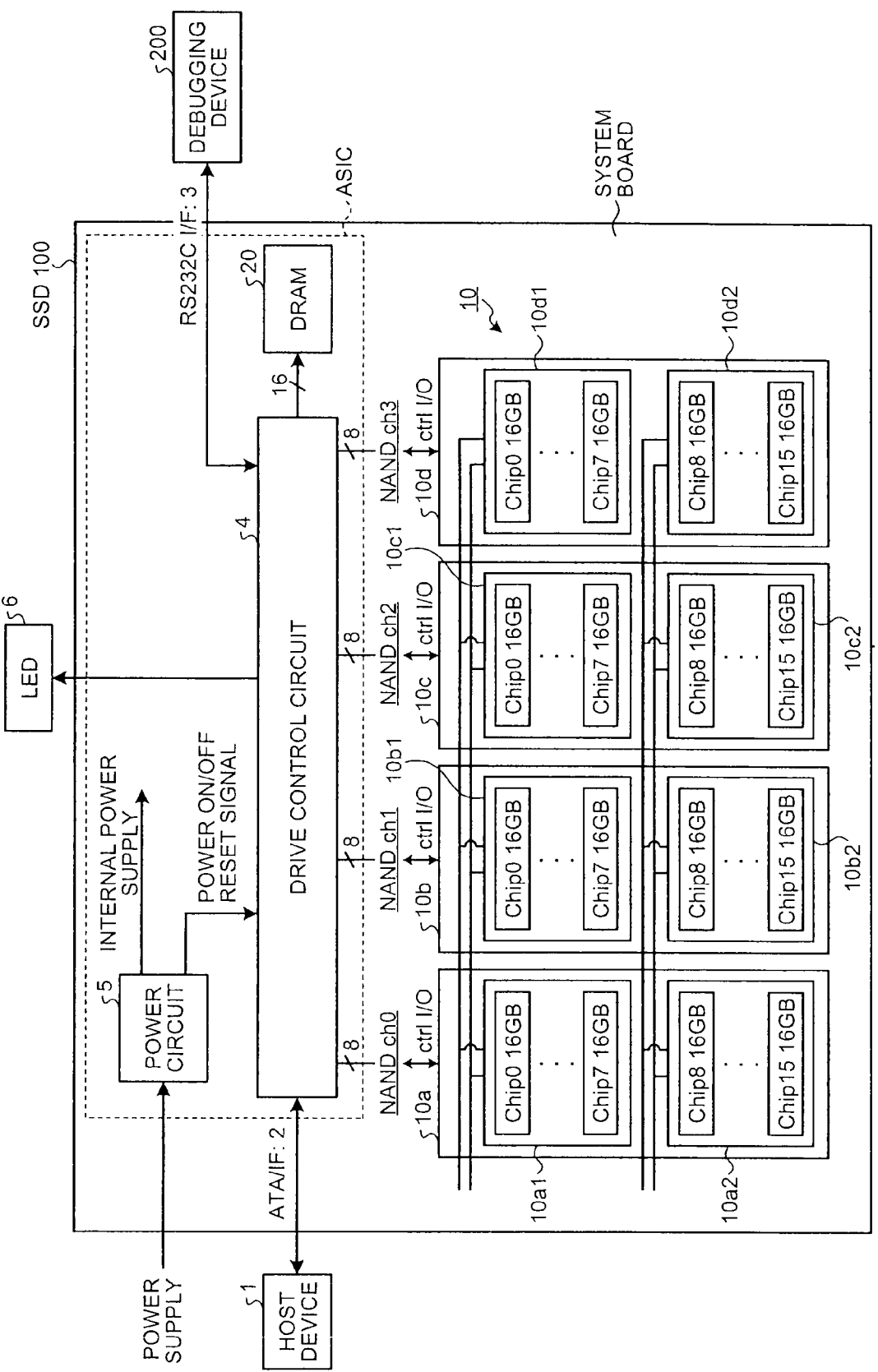
FIG. 1 is a block diagram of a configuration example of an SSD.

FIG. 1 is a block diagram of a configuration example of an SSD 100. The SSD 100 includes an ASIC and a NAND memory 10 mounted on a system board. A drive control circuit 4, a power circuit 5, and a DRAM 20 are mounted on the ASIC.

The SSD 100 is connected to a host device (host) 1 such as a personal computer or a CPU core via a memory connection interface such as an ATA interface (ATA I/F), and functions as an external memory of the host device 1. The SSD 100 can transfer data with a debugging device 200 via a communication interface such as an RS232C interface (RS232C I/F) 3. The SSD 100 includes a NAND flash memory (hereinafter, "NAND memory") 10 as a nonvolatile memory, a drive control circuit 4 as a controller, a DRAM 20 as a volatile memory, a power circuit 5, an LED 6 for status display, and the like.

The power circuit 5 generates a plurality of different internal DC power supply voltages from an external DC power supply supplied from the power circuit on the host device 1 side, and supplies these internal DC power supply voltages to respective circuits in the SSD 100. The power circuit 5 detects a leading or trailing edge of the external power supply, and generates a power-on reset signal or a power-off reset signal to supply the signal to the drive control circuit 4.

The NAND memory 10 includes 4-channel NAND memory packages 10*a* to 10*d*. One NAND memory package includes a packed plurality of NAND memory chips (hereinafter, "Chip"). In an example shown in FIG. 1, for example, the NAND memory package 10*a* includes 8 Stack Chip 10*a*1 in which eight Chips 0 to 7 (for example, 1 Chip=16 gigabytes) are stacked and an 8 Stack Chip 10*a*2 in which eight Chips 8 to 15 are stacked. Other NAND memory packages 10*b* to 10*d* also include two sets of 8 Stack Chips, and the NAND memory 10 has a capacity of 128 gigabytes. The 4-channel NAND memory packages 10*a* to 10*d* can be operated in parallel of four.

The DRAM 20 functions as a data transfer cache between the host device 1 and the NAND memory 10 and a work area memory. The drive control circuit 4 performs data transfer control between the host device 1 and the NAND memory 10 via the DRAM 20, and controls the respective components in the SSD 100. The drive control circuit 4 has a function for supplying a status display signal to the status display LED 6 and for supplying a reset signal and a clock signal to the own circuit and the respective units in the SSD 100, upon reception of a power ON/OFF reset signal from the power circuit 5.

Figure 2:
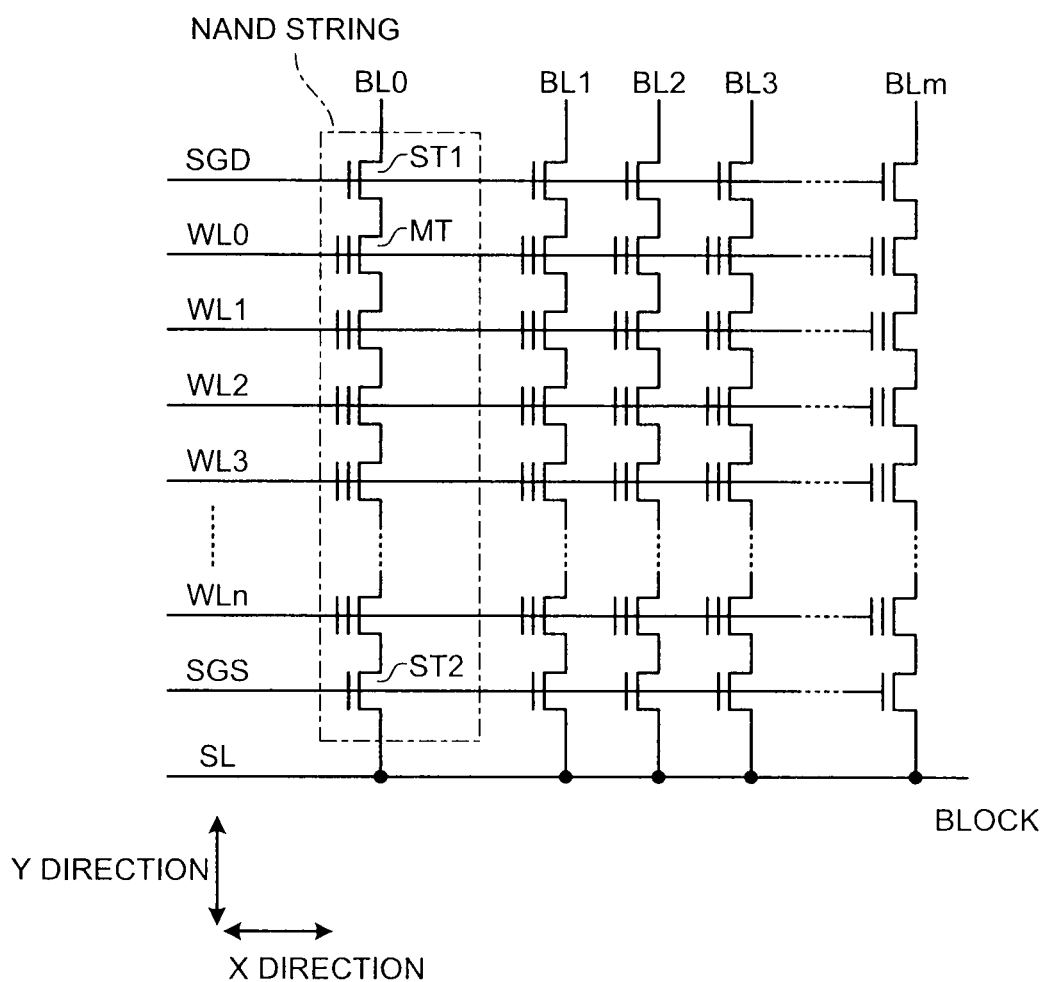
FIG. 2 is a circuit diagram of a configuration example of one block included in a NAND memory chip.

In the respective NAND memory chips, a block, which is a unit of data erasure, is arranged in a plurality of numbers. FIG. 2 is a circuit diagram of a configuration example of one block included in the NAND memory chip. Each block includes (m+1) NAND strings (m is an integer equal to or larger than 0) arranged sequentially along an X direction. In a selection transistor ST1 respectively included in the (m+1) NAND strings, a drain is connected to bit lines BL0 to BLm and a gate is commonly connected to a selection gate line SGD, respectively. A source of a selection transistor ST2 is commonly connected to a source line SL and a gate thereof is commonly connected to a selection gate line SGS.

The respective memory cell transistors MT include a metal oxide semiconductor field effect transistor (MOSFET) including a stacked gate structure formed on a semiconductor substrate. The stacked gate structure includes a charge accumulating layer (floating gate electrode) formed on the semiconductor substrate with a gate dielectric film put therebetween, and a control gate electrode formed on the charge accumulating layer with an intergate dielectric film therebetween. In the memory cell transistors MT, a threshold voltage changes according to the number of electrons accumulated in the floating gate electrode, and the memory cell transistor MT stores data according to a difference of the threshold voltage. The memory cell transistor MT can be formed to store 1 bit or can be formed to store multivalued data (data equal to or larger than 2 bits).

In the respective NAND strings, the (n+1) memory cell transistors MT are arranged between the source of the selection transistor ST1 and the drain of the selection transistor ST2 so that respective current paths are serially connected. That is, the memory cell transistors MT are serially connected in a Y direction to share a diffusion region (a source region or a drain region) between adjacent memory cell transistors.

The control gate electrodes are respectively connected to the word lines WL0 to WLn in order of from the memory cell transistor MT positioned closest to the drain side. Therefore, the drain of the memory cell transistor MT connected to the word line WL0 is connected to the source of the selection transistor ST1, and the source of the memory cell transistor MT connected to the word line WLn is connected to the drain of the selection transistor ST2.

The word lines WL0 to WLn commonly connect the control gate electrodes of the memory cell transistors MT between the NAND strings in the block. That is, the control gate electrodes of the memory cell transistors MT, which are on the same line in the block, are connected to the same word line WL. The (m+1) memory cell transistors MT connected to the same word line WL are handled as one page, and writing and reading of data are performed for each page.

The bit lines BL0 to BLm commonly connect the drains of the selection transistors ST1 between the blocks. That is, the NAND strings on the same line in a plurality of blocks are connected by the same bit line BL.

As shown in FIG. 1, in the NAND memory 10, the NAND memory packages 10*a* to 10*d*, which are four parallel operating elements are connected in parallel to the drive control circuit 4 via four channels (4Ch) respectively having 8 bits. Three types of access modes described below can be provided by a combination of whether the four NAND memory packages 10*a* to 10*d* are singly operated, or operated in parallel, or a double speed mode of the NAND memory 10 is used.

(1) 8-Bit Normal Mode

In this mode, only one channel is operated to perform reading and writing in a unit of 8 bits. One unit of transfer size is page size (4 kilobytes).

(2) 32-Bit Normal Mode

In this mode, four channels are operated in parallel to perform reading and writing in a unit of 32 bits. One unit of transfer size is page size×4 (16 kilobytes).

(3) 32-Bit Double Speed Mode

In this mode, four channels are operated in parallel, and reading and writing are performed by using the double speed mode of the NAND memory 10. One unit of transfer size is page size×4×2 (32 kilobytes).

In the 32-bit normal mode or the 32-bit double speed mode in which four channels are operated in parallel, four or eight blocks operated in parallel become a unit of erasure in the NAND memory 10, and four or eight pages operated in parallel become a unit of writing and a unit of reading in the NAND memory 10.

Figure 3:
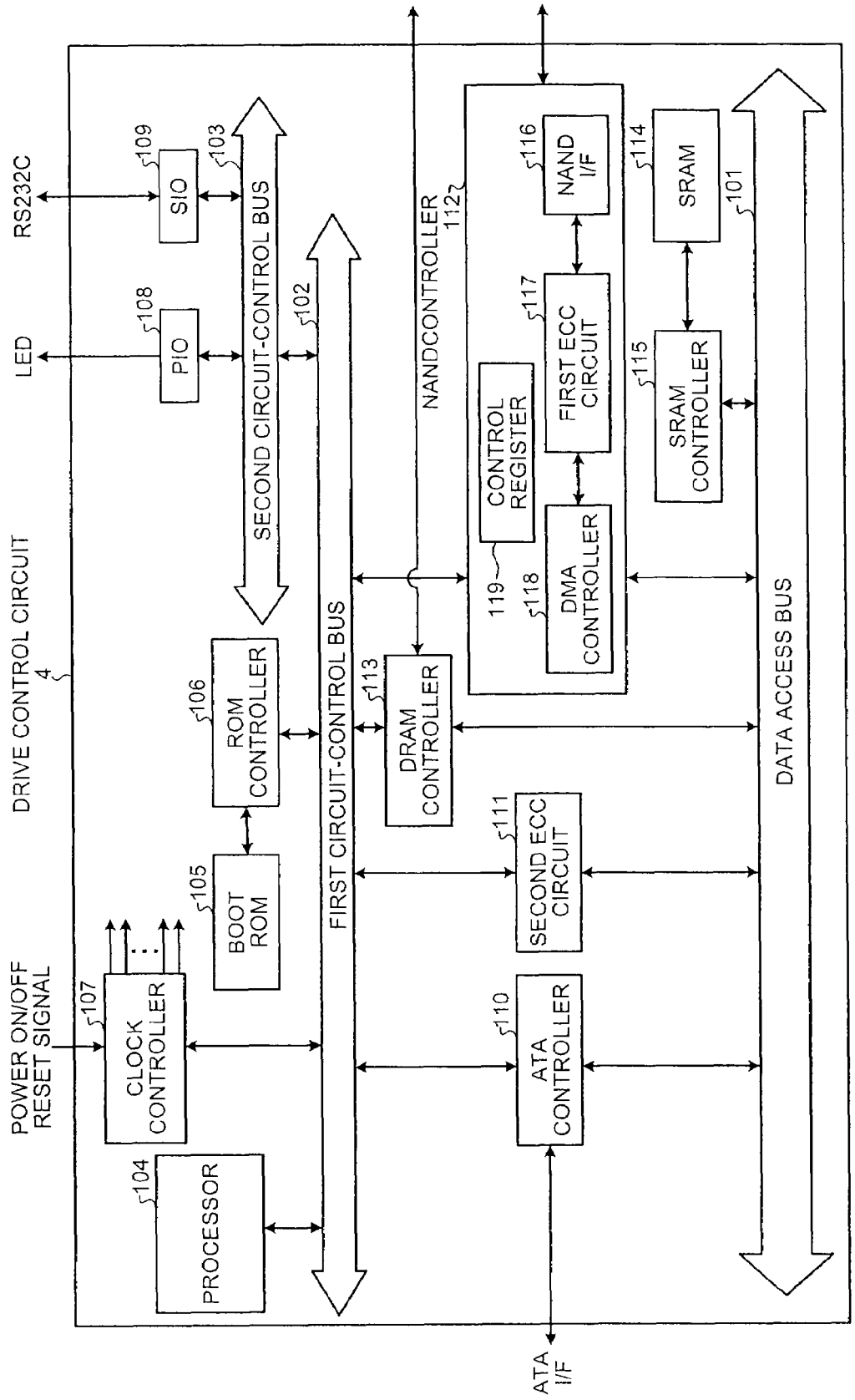
FIG. 3 is a block diagram of an internal hardware configuration example of a drive control circuit.

FIG. 3 is a block diagram of an internal hardware configuration example of the drive control circuit 4. The drive control circuit 4 includes a data access bus 101, a first circuit-control bus 102, and a second circuit-control bus 103. A processor 104 that controls the entire drive control circuit 4 is connected to the first circuit-control bus 102. A boot ROM 105 storing a boot program for booting respective management programs (firmware (FW)) stored in the NAND memory 10 is connected to the first circuit-control bus 102 via the ROM controller 106. To the first circuit-control bus 102 is connected a clock controller 107 that supplies the reset signal and the clock signal to the respective units, upon reception of the power ON/OFF reset signal from the power circuit 5 shown in FIG. 1.

The second circuit-control bus 103 is connected to the first circuit-control bus 102. A parallel IO (PIO) circuit 108 that supplies the status display signal to the status display LED 6 shown in FIG. 1 and a serial 10 (SIO) circuit 109 that control an RS232C I/F 3 are connected to the second circuit-control bus 103.

An ATA interface controller (ATA controller) 110, a second error check and correct (ECC) circuit 111, a NAND controller 112, and a DRAM controller 113 are connected to the data access bus 101 and the first circuit-control bus 102. The ATA controller 110 transfers data with the host device 1 via the ATA interface 2. An SRAM used as a data work area is connected to the data access bus 101 via an SRAM controller 115. The firmware stored in the NAND memory 10 is transferred to the SRAM 114 by the boot program stored in the boot ROM 105 at the time of startup.

The NAND controller 112 includes a NAND I/F 116 that performs interface processing with the respective NAND memory packages 10a to 10d in the NAND memory 10, a first ECC circuit 117, a DMA controller 118 for DMA transfer control that controls an access between the NAND memory 10 and the DRAM 20, and a control register 119 in which control data is written by the processor 104.

When data is written in the NAND memory 10, the first ECC circuit 117 generates an error detecting code (for example, CRC 32) and a first error correcting code (for example, Hamming code) having a correcting capability of 1 bit and adds the codes to the data to be written, for each predetermined unit data D (for example, 512 bytes). Further, the first ECC circuit 117 generates a second error correcting code (for example, BCH code) having a correcting capability of a plurality of bits (for example, 48 bits) and adds the code for each of eight pieces of unit data D. The data added with the error detecting code and the first error correcting code is written in the NAND memory 10 by the NAND I/F 116.

When data is read from the NAND memory 10, the first ECC circuit 117 performs a first error correction first with respect to the data read from the NAND memory 10 by the NAND I/F 116, detects whether there is an error based on the error detecting code, and stores the data after the first error correction, the number of correction bits by the first error correction, and the error detection result in the DRAM 20 via the DMA controller 118. When there is an error in the error detection result, that is, when the error cannot be corrected in the first error correction, the second ECC circuit 111 performs the second error correction, and stores the data after the second error correction and the number of correction bits by the second error correction in the DRAM 20.

Figure 4:
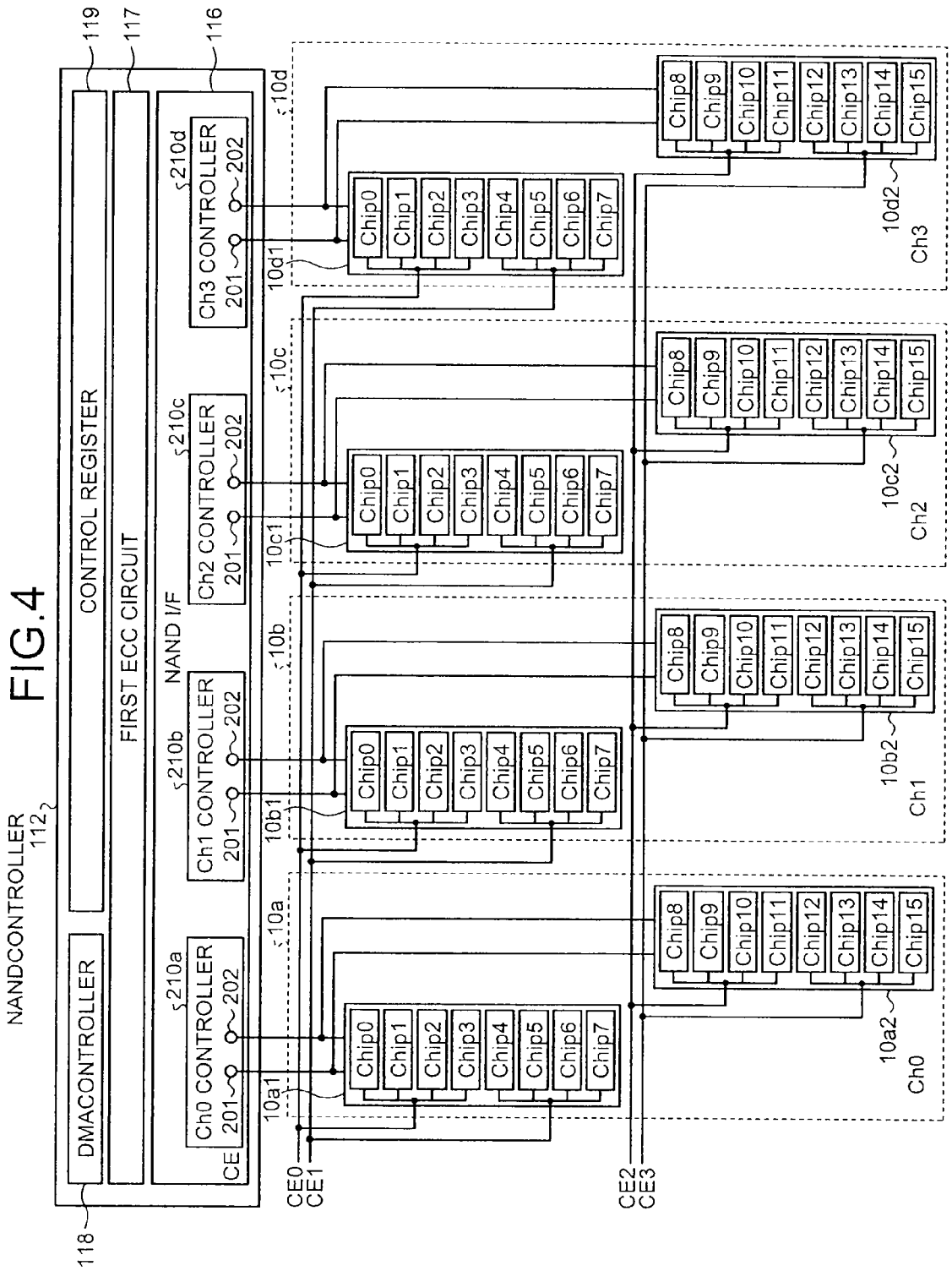
FIG. 4 is an explanatory diagram of a connection between a NAND I/F and the NAND memory.

FIG. 4 is an explanatory diagram of a connection between the NAND I/F 116 and the NAND memory 10. The NAND I/F 116 includes Ch0 controller 210a to Ch3 controller 210d, which are 4-channel interface circuits, and a control signal pin 201 and an IO signal pin 202 of the respective Ch0 controller 210a to Ch3 controller 210d are independently connected to the NAND packages 10a to 10d (NAND Ch0 to Ch3) of Ch0 to Ch3. A control signal is output from the control signal pin 201 and 8-bit data elements IO0 to IO7 are input and output from the IO pin 202. Chip enable (CE) 0 to 3 signals from the NAND I/F 116 select the NAND packages 10a to 10d (NAND Ch0 to Ch3).

Figure 5:
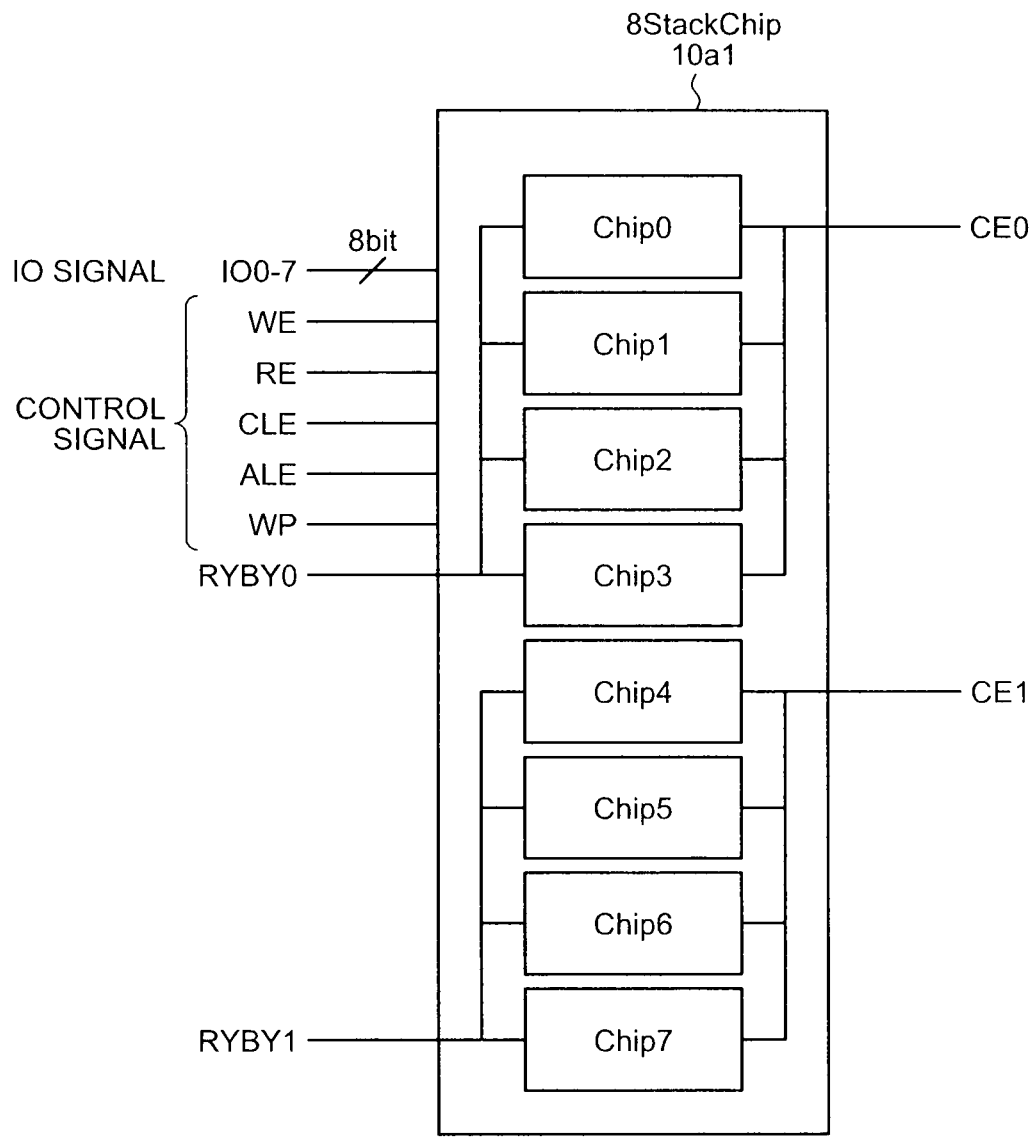
FIG. 5 is an explanatory diagram of a load capacity of the NAND memory and a CR delay.
Figure 6:
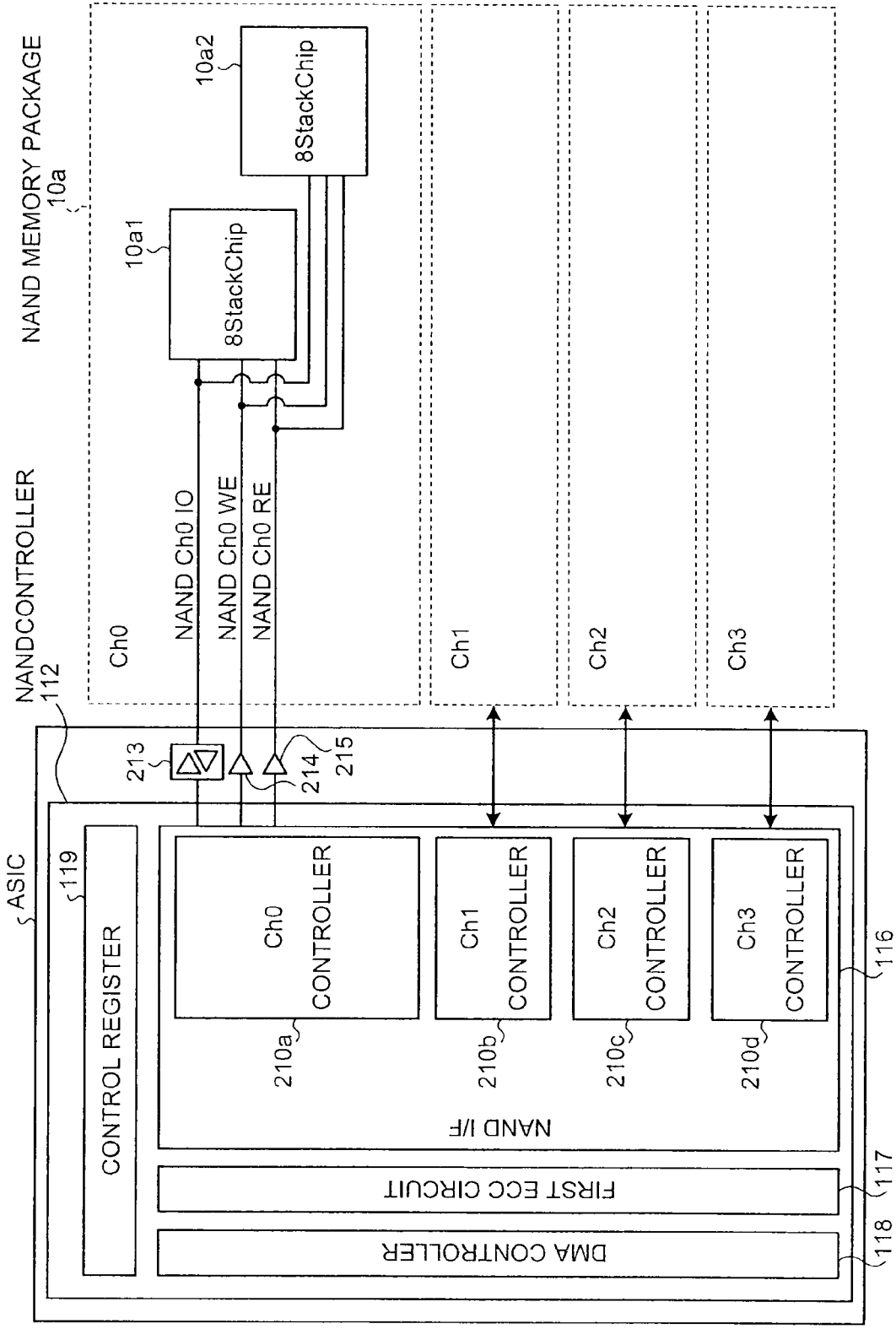
FIG. 6 is an explanatory diagram of a load capacity of the NAND memory and the CR delay.

In the explanations below, because the configuration of the respective channels is the same, Ch0 is explained as a representative. FIGS. 5 and 6 are explanatory diagrams of a load capacity of the NAND memory 10 and a CR delay. In FIG. 6, reference numeral 213 denotes an input/output IO, and 214 and 215 denote an output IO.

As shown in FIG. 5, in the 8 Stack Chip 10a1, because the IO data IO0 to IO7 and the control signals {write enable (WE) signal, read enable (RE) signal, command latch enable (CLE) signal, address latch enable (ALE) signal, write protect (WP) signal, and the like} have 8 chips per one signal, the load capacity increases to eight times. To decrease the number of signal pins, the NAND package 10a includes two 8 Stack Chips 10a1 and 10a2 having the IO signals IO0 to IO7 and the control signal, and therefore the load capacity further increases to two times. Accordingly, the CR delay increases. Generally, because the load capacity of the IO data is larger than that of the control signal, there is a delay difference between the IO data and the control signal.

Figure 7:
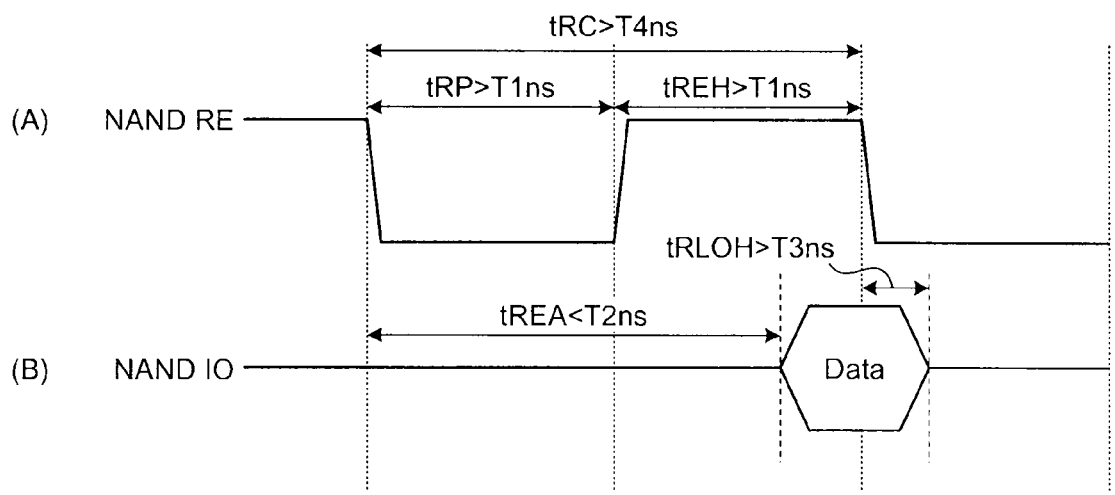
FIG. 7 is a timing chart for explaining reading of data from the NAND memory.

FIG. 7 is a timing chart for explaining reading of data from the NAND memory 10. In FIG. 7, reference sign (A) indicates an RE signal, and (B) indicates the IO data. It is assumed here that the system specification is such that an output of the read data is ensured after tREA has passed since the trailing edge of the RE signal, and after tRLOH has passed since the leading edge of the RE, the output of the read data is not ensured. In this case, when the load capacity is large and the CR delay is large, data cannot be obtained at a latch timing when tREA is delayed and the load capacity is small, and therefore timing adjustment is required.

Figure 8:
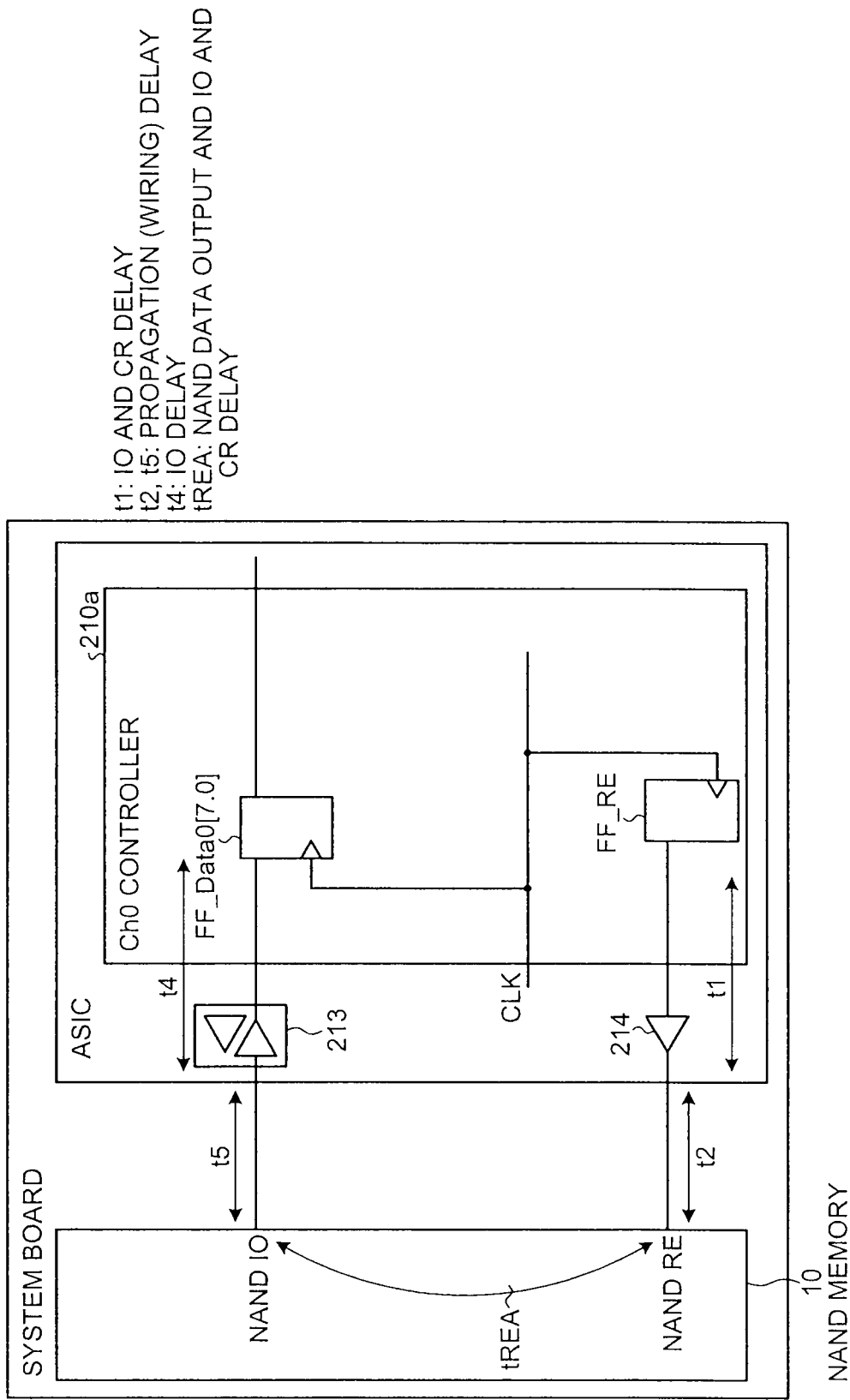
FIG. 8 is an explanatory diagram of a complete synchronous design circuit.
Figure 9:
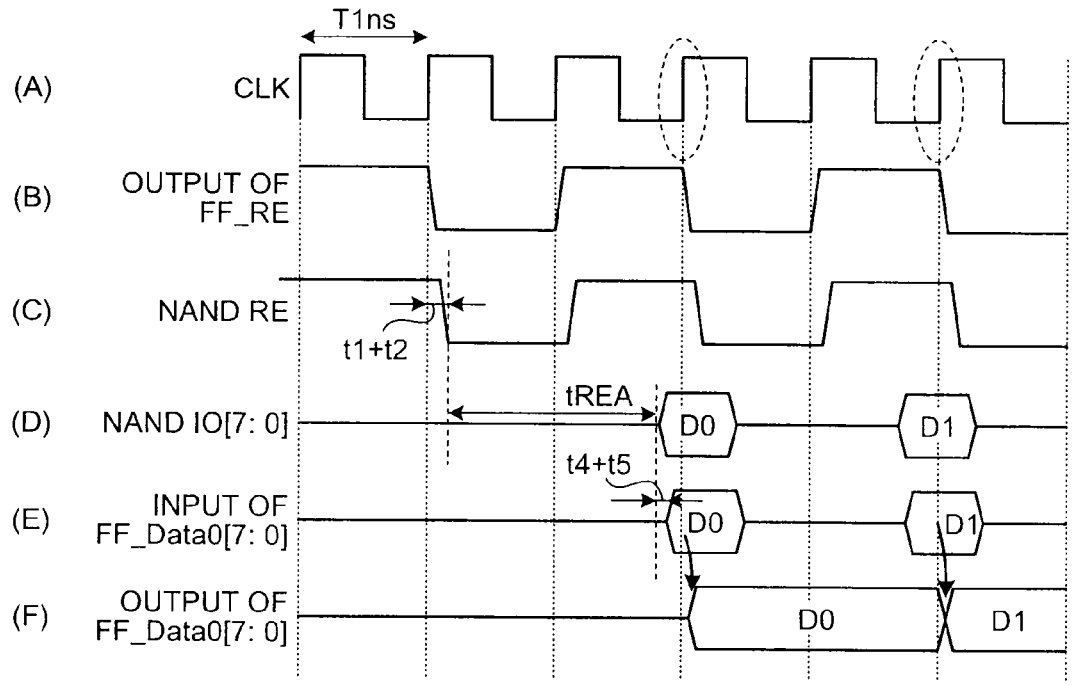
FIG. 9 is a timing chart when the load capacity is small.
Figure 10:
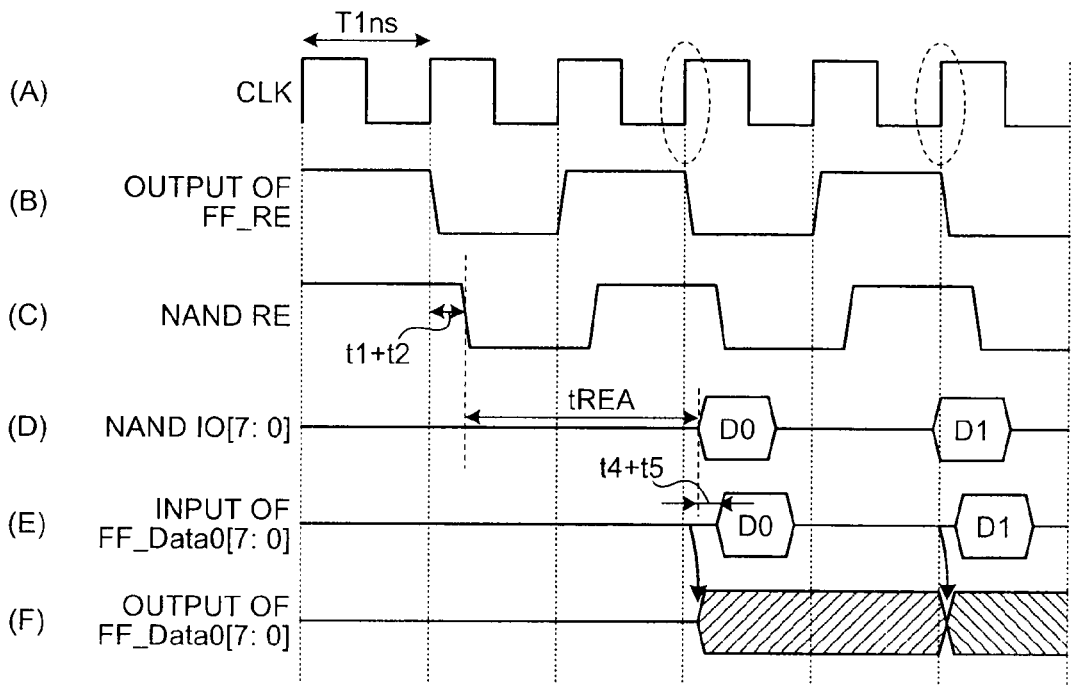
FIG. 10 is a timing chart when the load capacity is large.

A signal delay when a complete synchronous design circuit is included in a channel controller in the NAND I/F 116 is explained with reference to FIGS. 8 to 10. FIG. 8 is an explanatory diagram of the complete synchronous design circuit, FIG. 9 is a timing chart when the load capacity is small, and FIG. 10 is a timing chart when the load capacity is large. A flip flop is described below as FF.

In FIG. 8, the Ch0 controller 210a includes an FF_RE that outputs RE in synchronization with an internal clock CLK generated by the clock controller 107 (see FIG. 3), and an FF_DATA [7:0] that latches IO[7:0] and outputs it in synchronization with the internal clock CLK. In FIG. 8, reference character t1 denotes IO and CR delay, t2 and t5 denote propagation (wiring) delay, t4 denotes IO delay, and tREA denotes NAND data output and IO and CR delay.

In FIGS. 9 and 10, (A) indicates the internal clock CLK, (B) indicates an output of FF_RE, (C) indicates NAND RE, (D) indicates NAND IO[7:0], (E) indicates an input of FF_DATA[7:0], and (F) indicates an output of FF_DATA [7:0].

Figure 11:
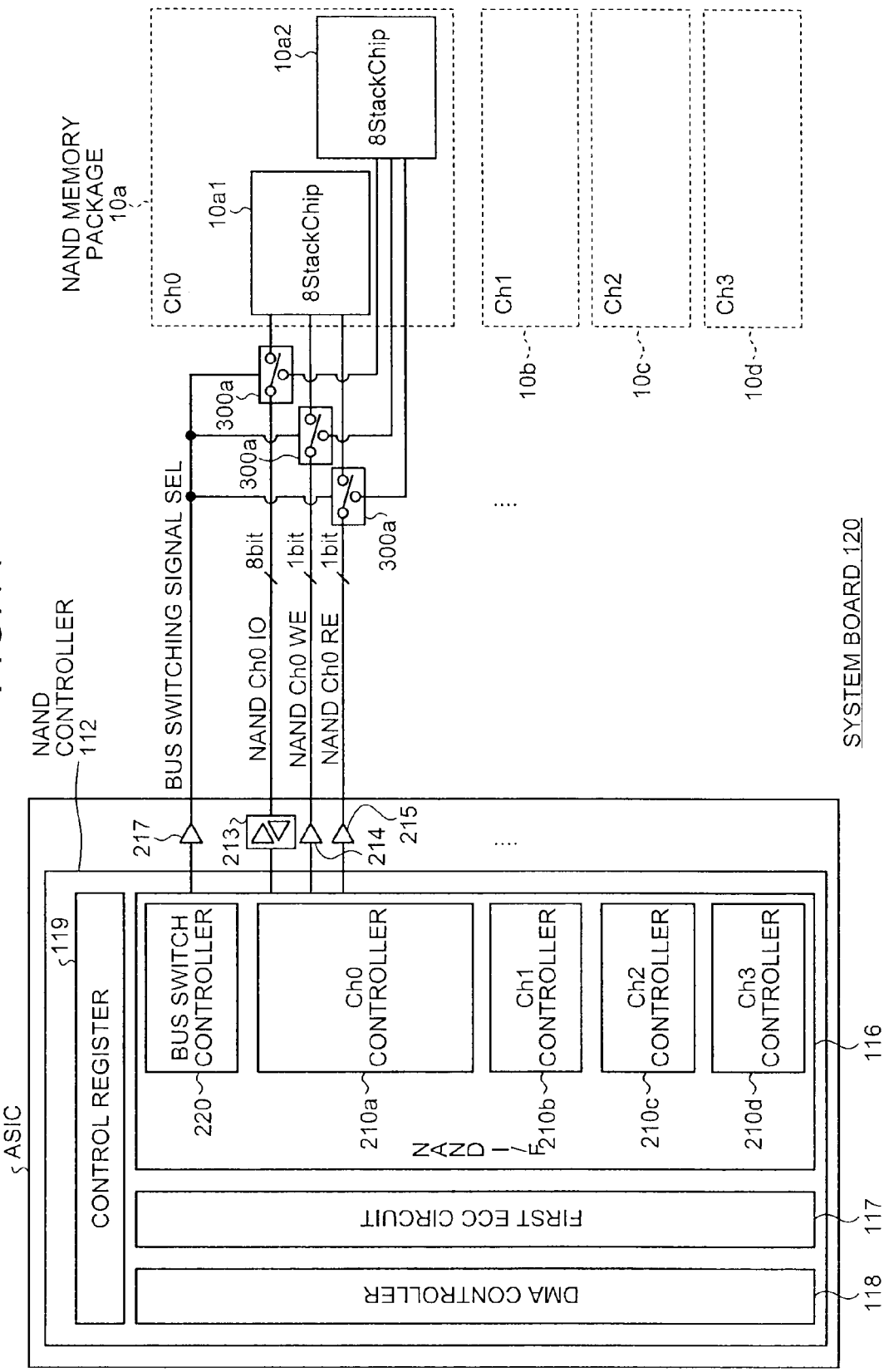
FIG. 11 is a schematic diagram for explaining a NAND controller and a NAND memory according to a first embodiment of the present invention.

As shown in FIG. 9, when the load capacity is small, the CR delays of t1 and tREA are small. Therefore, data can be obtained at the timing of the internal clock CLK. On the other hand, as shown in FIG. 11, when the load capacity is large, the CR delays of t1 and tREA become large. Therefore, data cannot be obtained at the timing of the internal clock CLK.

While a case of data read has been explained above, a write error may occur due to the signal delay. Therefore, to prevent the signal delay, the load capacity of the signal line (bus line) needs to be reduced at the time of accessing (read/write) the NAND memory 10.

A method for preventing the signal delay by reducing the load capacity of the signal line at the time of accessing the NAND memory 10 is explained with reference to FIGS. 11 to 15. In the present embodiment, a bus switch that switches connection of the signal line between the NAND controller 112 and the Chip is provided to block the connection with the Chip, which is not accessed at the time of read/write from/in the NAND memory 10, thereby reducing the load capacity of the signal line at the time of read/write and prevent the signal delay.

FIG. 11 is a schematic diagram for explaining the NAND controller 112 and the NAND memory 10 according to a first embodiment of the present invention. In FIG. 11, like reference characters refer to like parts having the same function as those shown in FIG. 6, and explanations of the common parts will be omitted. In the first embodiment, as shown in FIG. 11, a bus switch 300a is provided in the system board 120. While only channel Ch0 is shown in FIG. 11, the bus switch is respectively provided in other channels Ch1 to Ch3. In FIG. 11, reference numeral 217 denotes an output IO.

In the first embodiment, the bus switch 300a for switching the connection of the signal lines of the IO signals IO1 to IO7 and the control signals (WE, RE, . . . ) between 8 Stack Chip 10a1 and 8 Stack Chip 10a2 is arranged on the system board 120. A switch having an 8-bit width is used for the bus switch 300a for the IO, and a switch having a 1-bit width is used for the bus switch 300a for the control signals. Because FIG. 11 schematically depicts the bus switch 300a and any well-known bus switch can be used for the bus switch 300a, detailed explanations thereof will be omitted. The NAND I/F 116 in the NAND controller 112 includes a bus switch controller 220 that controls switching of the bus switch 300a.

The bus switch controller 220 executes switching control of the bus switch 300a by a bus switching signal, and switches between upper rank (8 Stack Chip 10a1 side) and lower rank (8 Stack Chip 10a2 side) of the bus switch 300a according to an address at the time of read and write. The bus switch controller 220 outputs a bus switching signal SEL (Low) to the respective bus switches 300a when the processor 104 issues an access command to the 8 Stack Chip 10a1 side, and outputs a bus switching signal SEL (High) to the respective bus switches 300a when the processor 104 issues an access command to the 8 Stack Chip 10a2 side. The bus switch controller 220 similarly controls switching of the bus switch (not shown) provided on channels ch1 to ch3.

The bus switch 300a connects the 8 Stack Chip 10a1 side when the bus switching signal is SEL (Low), and connects the 8 Stack Chip 10a2 side when the bus switching signal SEL (High).

In the case of read/write with respect to the 8 Stack Chip 10a1, the 8 Stack Chip 10a2 is in a disconnected state, and in the case of read/write with respect to the 8 Stack Chip 10a2, 8 Stack Chip 10a1 is in the disconnected state. Therefore, the load capacity of the signal line at the time of read/write can be reduced to ½.

In the first embodiment, the division number of the load is two. However, the present invention is not limited thereto, and the load can be appropriately divided according to the number of pins of the NAND controller 112 or the load of the NAND memory 10.

Figure 12:
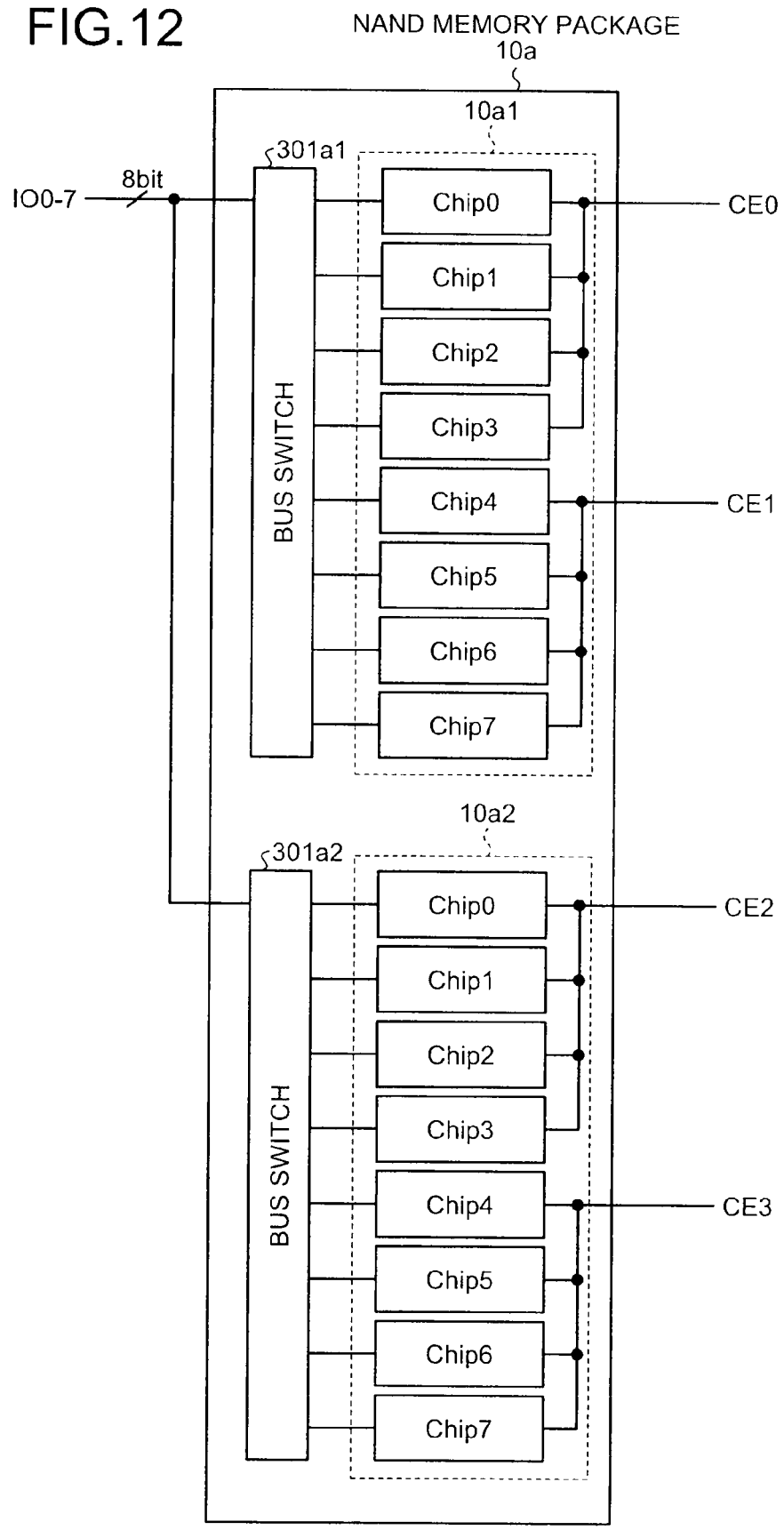
FIG. 12 is a schematic diagram for explaining a NAND controller and a NAND memory according to a second embodiment of the present invention.

In the first embodiment, the bus switch 300a is provided on the system board 120. On the other hand, in a second embodiment of the present invention, a bus switch is provided in the NAND memory packages 10a to 10d. FIG. 12 is a schematic diagram for explaining the NAND memory 10 according to the second embodiment. While only the NAND memory package 10a is show in FIG. 12, the NAND memory packages 10b to 10d have the same configuration.

As shown in FIG. 12, a bus switch 301a1 that selects and connects any one of Chips 0 to 7 of the 8 Stack Chip 10a1, and a bus switch 301a2 that selects and connects any one of Chips 0 to 7 of the 8 Stack Chip 10a2 are provided in the NAND memory package 10a. The bus switches 301a1 and 301a2 respectively select (decode) a Chip to be accessed based on an access address, to connect the selected Chip. In the second embodiment, because the bus switches 301a1 and 301a2 select the Chip to be accessed based on the access address, the bus switch controller 220 (see FIG. 11) is not required as in the first embodiment.

Figure 13B:
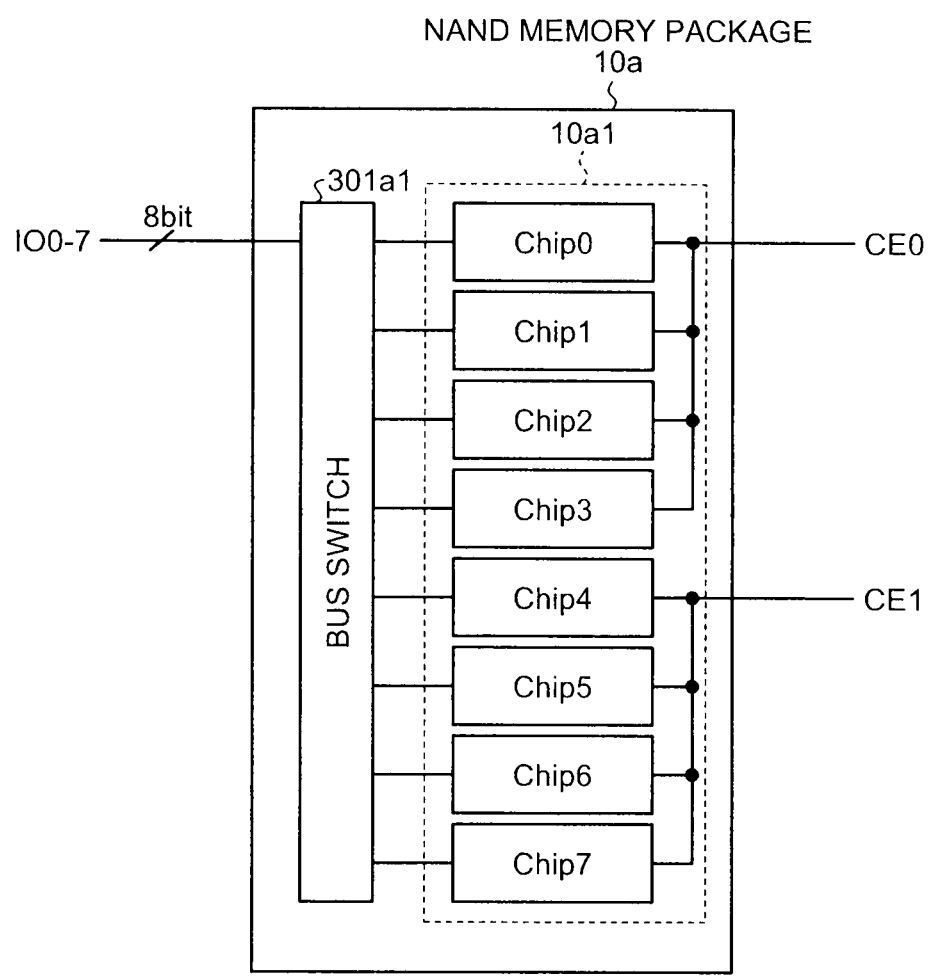
FIG. 13B is a schematic diagram for explaining a second modification of the second embodiment.
Figure 13C:
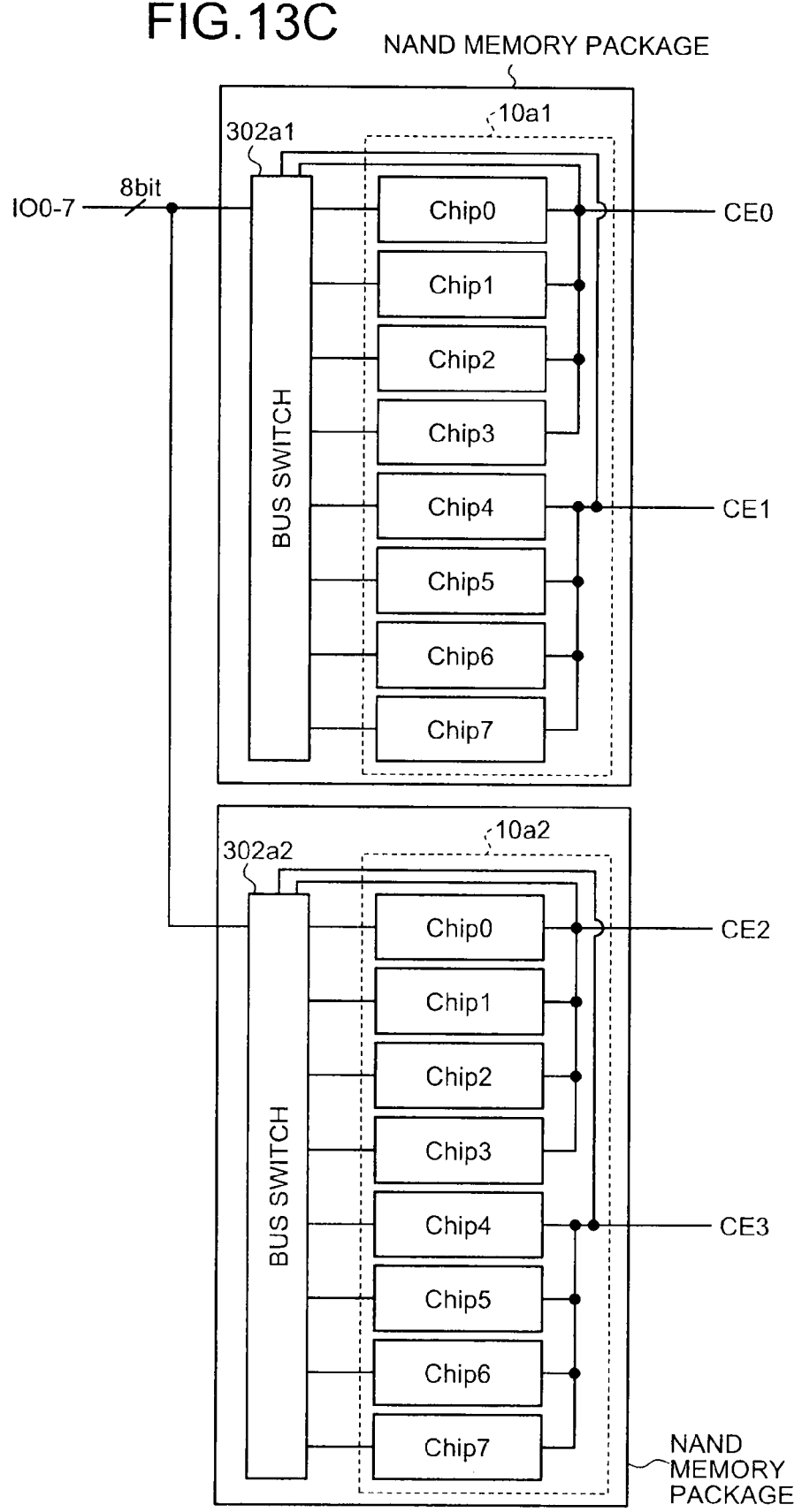
FIG. 13C is a schematic diagram for explaining a third modification of the second embodiment.

In the second embodiment, only the bus switches 301a1 and 301a2 for the IO signals are shown. However, the bus switch can be provided for all control signals such as WE and RE. In the second embodiment, the bus switch is provided for each of the 8 Stack Chips 10a1 and 10a2. However, as shown in FIG. 13A, switching of connection of the 8 Stack Chips 10a1 and 10a2 can be performed by one bus switch 302a. Further, as shown in FIG. 13B, the NAND memory package can be formed of one 8 Stack Chip, and one bus switch can be provided in the 8 Stack Chip. Furthermore, as shown in FIG. 13C, the configuration can be such that the NAND memory package is formed for each 8 Stack Chip, one bus switch is provided in each 8 Stack Chip, and Chip Enable (CE) signals 0 to 3 are input to the bus switches 301a1 and 301a2 in order to prevent that a Chip is simultaneously selected in the respective 8 Stack Chips. The bus switches 301a1 and 301a2 select a Chip group based on the Chip Enable (CE) signals 0 to 3, and select (decode) a Chip to be accessed based on the access address, thereby connecting the selected Chip. According to the second embodiment, therefore, in addition to the effect of the first embodiment, the controller need not control the bus switch, and because the bus switch is built in the memory, the number of parts decreases, thereby enabling downsizing.

Figure 14:
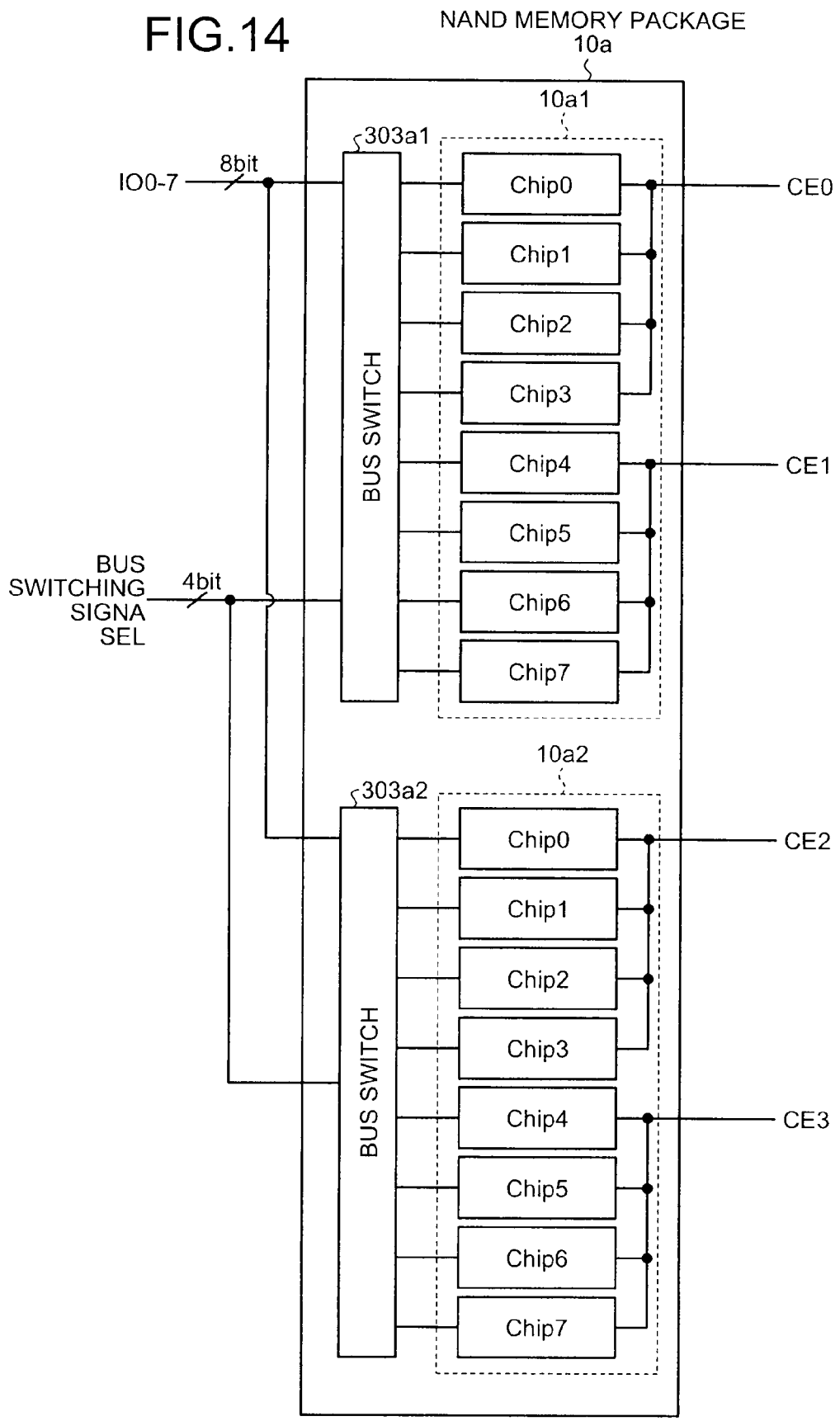
FIG. 14 is a schematic diagram for explaining a NAND controller and a NAND memory according to a third embodiment of the present invention.

In the second embodiment, the bus switches 301a1 and 301a2 select the Chip to be accessed based on the access address. On the other hand, a third embodiment of the present invention has such a configuration that a bus switch switches connection of the Chip based on the bus switching signal SEL input from the NAND controller 112. FIG. 14 is a schematic diagram for explaining the NAND memory 10 according to the third embodiment. While only the NAND memory package 10a is shown in FIG. 14, the NAND memory packages 10b to 10d have the same configuration.

In FIG. 14, bus switches 303a1 and 303a2 connect any one of Chips 0 to 7 of the 8 Stack Chip 10a1 and any one of Chips 0 to 7 of the 8 Stack Chip 10a2 based on the bus switching signal SEL input from the NAND controller 112. Accordingly, the load capacity of the signal line can be reduced to prevent a signal delay. The third embodiment can be also configured like modifications of the second embodiment (FIGS. 13A to 13C).

The second embodiment has a configuration in which connection is switched by the bus switch per Chip of the NAND memory 10. On the other hand, a fourth embodiment of the present invention has such a configuration that the connection is switched by the bus switch per a plurality of Chips of the NAND memory 10. FIG. 15 is a schematic diagram for explaining the NAND memory 10 according to the fourth embodiment. While only the NAND memory package 10a is shown in FIG. 15, the NAND memory packages 10b to 10d have the same configuration.

As shown in FIG. 15, in the 8 Stack Chip 10a1, signal lines for Chips 0 to 3 (Chip group) and Chips 4 to 7 (Chip group) are respectively arranged, that is, arranged for each unit (for 4 Chips) of CE signals. Likewise, signal lines in the 8 Stack Chip 10a2 are arranged for each unit (for 4 Chips) of the CE signals. Bus switches 304a1 and 304a2 select a Chip group to be accessed based on an access address, to switch the connection to the selected Chip group. Accordingly, the load capacity of the signal line can be reduced to prevent a signal delay. The fourth embodiment can be also configured like the modifications of the second embodiment (FIGS. 13A to 13C).

The first to fourth embodiments can be implemented by appropriate combinations. For example, as in the first embodiment, when the bus switch is arranged on the system board, the bus switch can switch the connection of the signal lines according to the access address as in the second embodiment, or the bus switch switches the connection per one Chip or per a plurality of Chips as in the second and fourth embodiments.

As explained above, according to the above embodiments, because the NAND controller 112 and the bus switch that switches the connection of the signal lines between a plurality of Chips incorporated in the NAND memory 10 are provided, when the NAND memory 10 is accessed, the Chip to be accessed can be connected and connection of the Chip not to be accessed can be cut off by the bus switch. Accordingly, the load capacity of the signal line at the time of accessing the NAND memory 10 can be reduced, and even if the load capacity of the signal line in the NAND memory 10 is increased, a signal delay can be prevented.

Because the bus switch is mounted on the system board 120 or the NAND memory 10, a position to arrange the bus switch can be determined, while taking a layout of the SSD 100 into consideration.

Further, the bus switch controller 220 that outputs a bus switching signal instructing switching of the bus switch to the bus switch according to read/write address is provided in the NAND I/F 116 of the NAND controller 112, and the bus switch performs switching of connection of the signal line based on the bus switching signal. Accordingly, the configuration of the bus switch can be simplified.

Because the bus switch performs switching of connection of the signal line according to the read/write address, the configuration of the NAND controller 112 can be simplified.

Further, because the bus switch performs switching of connection of the signal line per one Chip or a plurality of Chips, the number of Chip units for switching the connection can be appropriately selected according to the number of pins of the NAND controller 112 and the load capacity of the signal line in the NAND memory 110.

While the present invention is applied to the SSD having a NAND memory in the above embodiments, the present invention can be also applied to other types of SSDs, such as an SSD with a NOR flash EEPROM.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A memory system comprising:
a board;
a package for a memory chip mounted on the board;
a first nonvolatile memory chip in the package;
a second nonvolatile memory chip in the package;
a first signal wiring in the package electrically connected to the first nonvolatile memory chip;
a second signal wiring in the package electrically connected to the second nonvolatile memory chip;
an interface configured to communicate with a host;
a first controller configured to control power supply to the memory system which includes the first nonvolatile memory chip and the second nonvolatile memory chip; and
a second controller configured to control a load capacity of the first nonvolatile memory chip and the second nonvolatile memory chip according to a command from the host by switching a connection of the first signal wiring and the second signal wiring, wherein
the second controller controls the load capacity of the first nonvolatile memory chip to be increased and the load capacity of the second nonvolatile memory chip to be reduced, when the first nonvolatile memory chip is accessed, and when the power of the first nonvolatile memory chip and the second nonvolatile memory chip is on,
the second controller controls the load capacity of the first nonvolatile memory chip to be reduced and the load of the second nonvolatile memory chip to be increased, when the second nonvolatile memory chip is accessed when the power of the first nonvolatile memory chip and the second nonvolatile memory chip is on.

2. The memory system according to claim 1, wherein
the second controller controls the load capacity of the first nonvolatile memory chip to be increased and the load capacity of the second nonvolatile memory chip to be reduced by disconnecting the second signal wiring, when the first nonvolatile memory chip is accessed, and
the second controller controls the load capacity of the first nonvolatile memory chip to be reduced and the load of the second nonvolatile memory chip to be increased by disconnecting the first signal wiring, when the second nonvolatile memory chip is accessed.

3. The memory system according to claim 1, wherein
a plurality of the first nonvolatile memory chips stacked on each other and a plurality of the second nonvolatile memory chips stacked on each other are mounted in the package,
the first signal wiring in the package is electrically connected to the plurality of the first nonvolatile memory chips respectively, and
the second signal wiring in the package is electrically connected to the plurality of the second nonvolatile memory chips respectively.

4. The memory system according to claim 1, further comprising a bus switch configured to perform switching of connection of the first signal wiring and the second signal wiring, the bus switch being mounted on the board or the package.

5. The memory system according to claim 4, wherein the control circuit comprises a bus switch controller that outputs a bus switching signal that instructs switching of connection of the first signal wiring and the second signal wiring according to a read/write address, and
the bus switch performs switching of connection of the first signal wiring and the second signal wiring based on the bus switching signal.

6. The memory system according to claim 4, wherein the bus switch performs switching of connection of the first signal wiring and the second signal wiring according to the read/write address.

7. A memory system comprising:
a board;
a package for a memory chip mounted on the board;
a first nonvolatile memory chip in the package;
a second nonvolatile memory chip in the package;
a first signal wiring in the package electrically connected to the first nonvolatile memory chip;
a second signal wiring in the package electrically connected to the second nonvolatile memory chip;
an interface configured to communicate with a host;
a first controller configured to control power supply to the memory system which includes the first nonvolatile memory chip and the second nonvolatile memory chip; and
a second controller configured to control a load capacity of the first nonvolatile memory chip according to a command from the host by changing a connection of the first signal wiring and the second signal wiring, wherein
the second controller controls the load capacity of the first nonvolatile memory chip to be increased, when the first nonvolatile memory chip is accessed, and when the power of the first nonvolatile memory chip and the second nonvolatile memory chip is on, and the second controller controls the load capacity of the first nonvolatile memory chip to be reduced, when the second nonvolatile memory chip is accessed, and when the power of the first nonvolatile memory chip and the second nonvolatile memory chip is on.

8. A memory system comprising:

a first nonvolatile memory chip;

a first signal wiring electrically connected to the first nonvolatile memory chip;

an interface configured to communicate with a host;

a first controller configured to control power supply to the memory system which includes the first nonvolatile memory chip; and a second controller configured to control a load capacity of the first nonvolatile memory chip according to a command from the host by changing a connection of the first signal wiring, wherein the second controller controls the load capacity of the first nonvolatile memory chip to be increased, when the first nonvolatile memory chip is accessed, and when the power of the first nonvolatile memory chip is on, and the second controller controls the load capacity of the first nonvolatile memory chip to be reduced, when the first nonvolatile memory chip is not accessed, and when the power of the first nonvolatile memory chip is on.

9. A memory system comprising:

a board;

a first nonvolatile memory chip on the board;

a second nonvolatile memory chip on the board;

a first signal wiring in the board electrically connected to the first nonvolatile memory chip;

a second signal wiring in the board electrically connected to the second nonvolatile memory chip;

a first controller configured to control power supply to the first nonvolatile memory chip and the second nonvolatile memory chip, and a second controller configured to control a load capacity of the first nonvolatile memory chip and the second nonvolatile memory chip when the power of the first nonvolatile memory and the second nonvolatile memory is on, according to a command from a host by switching of connection of the first signal wiring and the second signal wiring.

* * * * *